May 17, 1966  J. FROOM  3,252,114
WAVEGUIDE COUPLER FOR A TRAVELING WAVE TUBE EMPLOYING
SLOW-WAVE STRUCTURE
Filed April 28, 1964  2 Sheets-Sheet 1

Inventor
JOCELYN FROOM
By *Percy L. Lantz*
Attorney

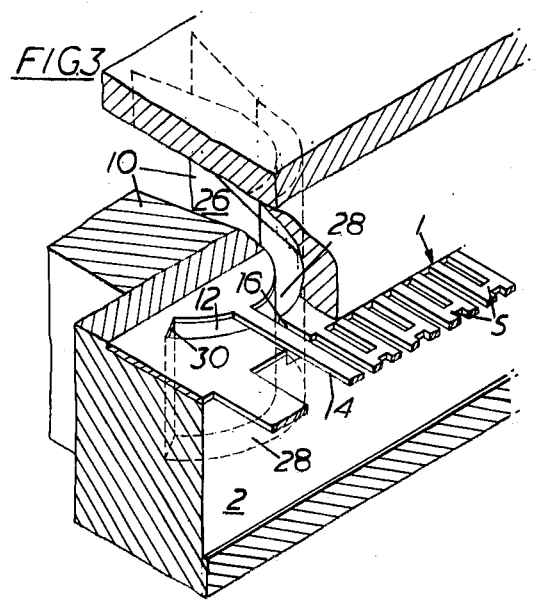

United States Patent Office 3,252,114
Patented May 17, 1966

3,252,114
WAVEGUIDE COUPLER FOR A TRAVELING WAVE TUBE EMPLOYING SLOW-WAVE STRUCTURE
Jocelyn Froom, London, England, assignor to International Standard Electric Corporation, New York, N.Y., a corporation of Delaware
Filed Apr. 28, 1964, Ser. No. 363,174
4 Claims. (Cl. 333—31)

The invention relates to an arrangement for coupling a slow-wave structure to a waveguide.

In travelling wave tubes employing slow-wave structures it is necessary to provide at least an output feeder to the slow-wave structure. At very short wavelengths such as in the millimetre-wave range such feeders have to be hollow waveguides rather than coaxial lines. One kind of waveguide feeder has a waveguide probe secured to a broad side of the waveguide and projecting across it and out through an aperture in the opposite side wall to be joined to or form part of the slow-wave structure. In some cases the orientation of the probe is determined by the form of the slow-wave structure and with the coupling arrangement mentioned above the orientation of the waveguide is similarly fixed. It is often desirable that the feeder waveguide be oriented at right angles to the direction of propagation of the slow-wave structure but if a straight probe transverse to the axis of the slow-wave structure is to be used, the feeder waveguide as described above would have to lie parallel to that axis.

According to the present invention there is provided an arrangement for coupling a slow-wave structure to a waveguide of higher impedance including a straight section of hollow waveguide whose cross-section decreases smoothly along its length, a curved portion of waveguide smoothly continuous with the smaller end of the straight section and short circuited at its distant end, and a straight waveguide probe connected to or forming a part of the slow-wave structure projecting transversely therefrom through an aperture in the wall of the curved portion of waveguide, across the waveguide and joined to the opposite waveguide wall, the arrangement being such that the straight section of hollow waveguide projects transversely to the slow-wave structure.

An embodiment of the invention will be described with reference to the accompanying drawings in which:

FIG. 3 is a perspective view of the coupling between waveguide and slow-wave structure in FIGS. 1 and 2 with parts broken away.

Figure 1:
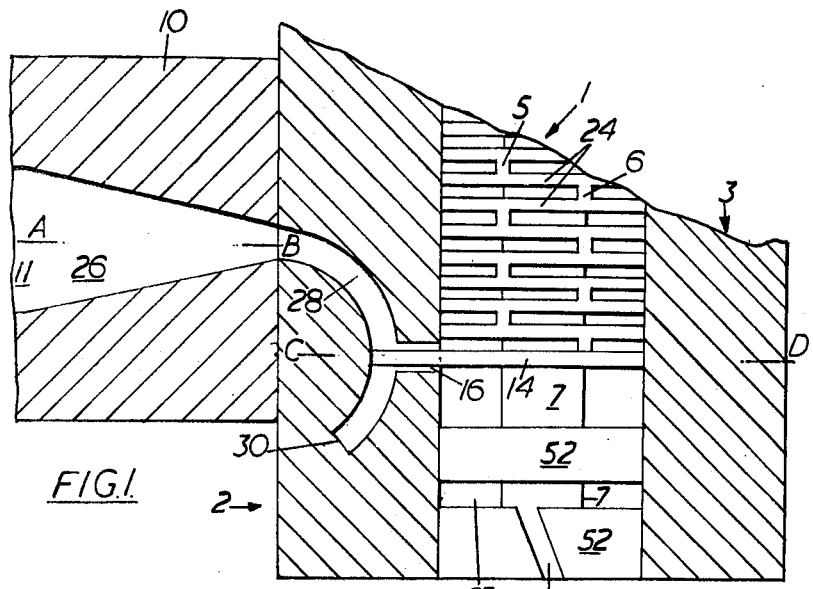
FIG. 1 is a plan view in part section and with parts removed of an end portion of a slow-wave structure and coupling arrangement according to the invention.
Figure 2:
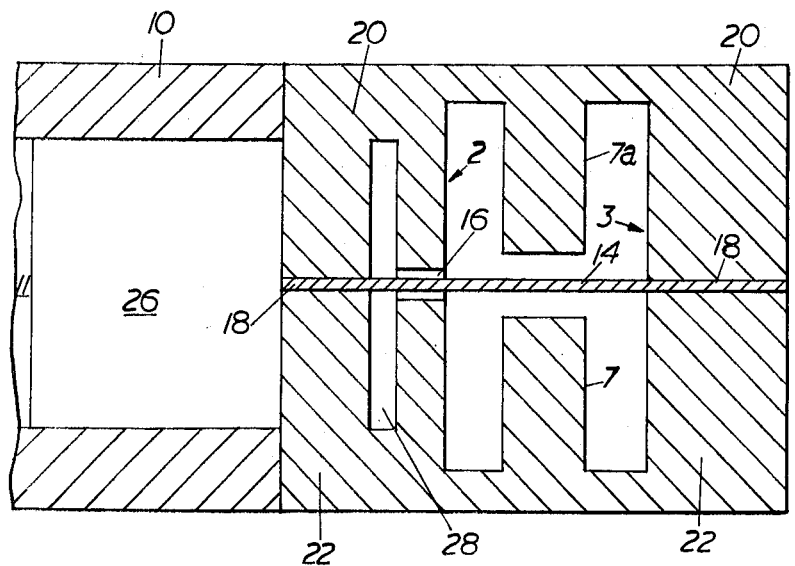
FIG. 2 is a cross-section through the lines AB, BC and CD of FIG. 1.

The slow-wave structure of the present embodiment includes a grating 1 formed of conductive bars 14, 24, equally spaced apart and parallel to one another, joined between opposite metal side walls 2 and 3, the bar 14 being the end bar of the grating, the other bars being designated 24. The bars are joined together by conductive straps 5 and 6 parallel to the side walls, the straps 5 being adjacent the side wall 2 and the straps 6 adjacent side wall 3, there being one strap 5 or 6 between each adjacent pair of bars. It will be seen that this pattern of grating provides a meander line along the bars and straps from end to end of the grating and the slow-wave structure may be considered as a meander line supported by stubs from side walls. In FIGS. 1 and 2 central ridge 7 is provided close to one side of the grating and connected to both side walls, but this ridge is not essential to the invention and is omitted in FIG. 3. The side walls extend above and below the grating a distance such that at their respective upper and lower ends the electromagnetic field of waves propagated by the structure is negligible.

In the embodiment shown the side walls are relatively thick. The grating 1 is formed as a single plate with cut-outs providing the bars and links by means, for example, of a photo-etching technique, the sides of the grating having continuous marginal portions 18. These marginal portions are sandwiched between metal blocks 20 and 22 which form the side walls above and below the grating. As shown in FIG. 2 two blocks 22 and the ridge 7 may be formed integrally with one another.

At the end of the slow-wave structure a metal block 10 is fastened to the outside of the side wall 2. A rectangular waveguide 11 is cut in the block 10, by means such as spark machining, with its longitudinal axis perpendicular to the longitudinal axis of the slow-wave structure—that is parallel to the bars 14, 24—and its broad sides perpendicular to the plane of the grating 1. A straight portion 26 of the rectangular waveguide is provided with smooth tapers in its narrow sides so that its impedance is reduced to approximate that of the input impedance of the slow wave structure as seen from the bar 14. The smaller end of the portion of waveguide 26 is continued smoothly into a curved portion of rectangular waveguide 28. The curved portion 28 is of uniform cross-section equal to that of the narrow end of waveguide section 26, is short-circuited at its far end 30, and is given a curvature such that it presents a convexity towards the grating 1, the arc of the waveguide being perpendicular to and opposite the end bar 14 of the grating at a quarter wavelength from its short-circuited end 30. The curved portion of waveguide 28 in this embodiment is formed in the two side wall blocks 20 and 22 by spark machining slots in them with an approximately semi-cylindrical electrode.

An aperture 16 is cut in the surface of the side wall 2 to allow passage therethrough of the bar 14 into the waveguide. This bar extends, as a waveguide probe, right across the curved portion of waveguide and is joined to the opposite waveguide wall. This is effected during manufacture of the present embodiment by providing shaped slots in the margin 18 of the grating 1, this marginal portion being later sandwiched between the two metal blocks 20 and 22 as previously explained.

Embodiments of the invention as described above have been found particularly convenient for use with millimetre wave travelling wave tubes and may be accurately manufactured by the use of spark erosion techniques for the waveguide sections and by photo-etching techniques for the production of the grating 1, including the probe portion of the coupling arrangement. It should be explained that although in FIGS. 1 and 2 the waveguide portions 11, 26 and 28 have been drawn approximately to scale (except for the length of the tapered portion 26), the width and the thickness of the bars of the grating have been exaggerated very considerably to enable the arrangement of the grating to be seen; in a practical embodiment where the length of the bars between the side walls was 140 units of length, the thickness of the side walls was 100 units, but the width of the bars was 5 units and the thickness of the grating 2.5 units. As previously explained, the grating 1 is produced by photo-etching, an enlarged master print being used. The grating is preferably made of molybdenum sheet material and, to prevent damage to the ends of the grating, a blank portion of the metal sheet is left at the ends, spaced away from the respective end bar. Thus, in FIG. 1 an end portion 52 has been left blank except for an oblique slot 54 communicating with a transverse slot 53. These slots are provided at the electron gun end of the slow wave structure, because, in use, the grating intercepts and approximately bisects the cross-section of the electron beam; the blank 52 has therefore to dissipate considerable heat and the slots allow for thermal expansion of the part on which the beam impinges.

It is to be understood that the following description of specific examples of this invention is not to be considered as a limitation on its scope.

What I claim is:

1. An arrangement for coupling a slow-wave structure to a waveguide of higher impedance including a straight section of hollow waveguide whose cross-section decreases smoothly along its length, a curved portion of waveguide smoothly continuous with the smaller end of the straight section and short circuited at its distant end, and a straight waveguide probe connected to or forming a part of the slow-wave structure projecting transversely therefrom through an aperture in the wall of the curved portion, across the wave-guide and joined to the opposite waveguide wall, the arrangement being such that the straight section of hollow waveguide projects transversely to the slow-wave structure.

2. An arrangement as claimed in claim 1 wherein the slow wave structure includes a planar grating of conductive bars joining opposing metal side walls which project above and below the plane of the grating, the curved portion of waveguide is a wall portion common to one of the metal side walls of the slow-wave structure, the common wall portion being apertured for passage of the probe and the probe being an extension of one of the said bars, this bar being joined to the curved waveguide wall instead of to the adjacent slow-wave structure side wall.

3. An arrangement as claimed in claim 2 wherein the grating is formed as an apertured metal sheet having continuous margins joined to the ends of the said bars and wherein the side walls include metal blocks between which the grating is sandwiched, at least a portion of the curved portion of waveguide being formed as aligned slots in a pair of the blocks forming a side wall, the margin of the grating adjacent the end of one of the bars being slotted in alignment with the said slots and having a portion integral with the last mentioned bar of the grating extending across the slots defining the curved portion of waveguide.

4. An arrangement as claimed in claim 1 wherein the waveguide is of rectangular cross-section having its broad sides perpendicular to the plane of the grating and of constant width throughout both the tapered and the curved portions of waveguide.

No references cited.

HERMAN KARL SAALBACH, *Primary Examiner.*